Patented July 23, 1929.

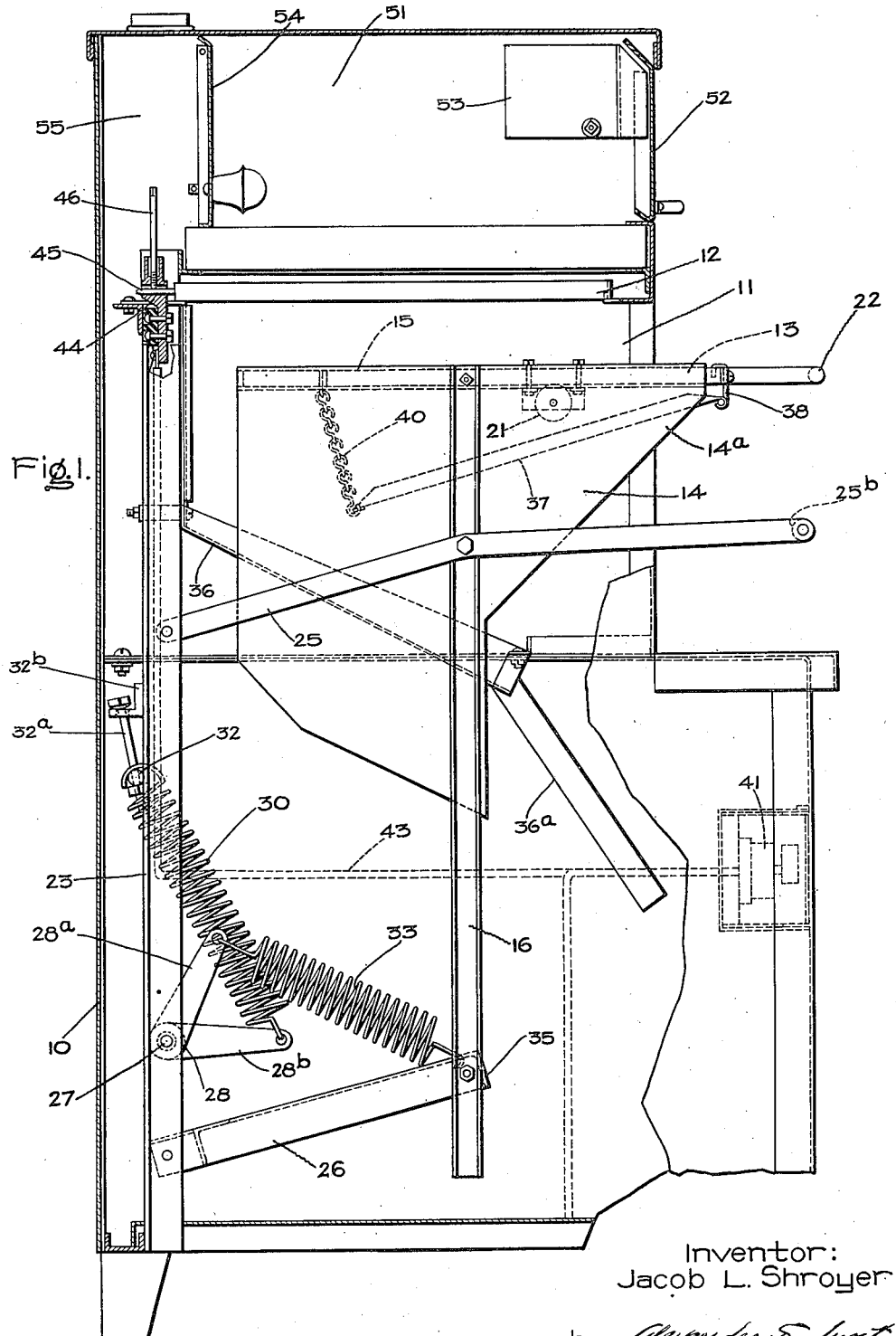

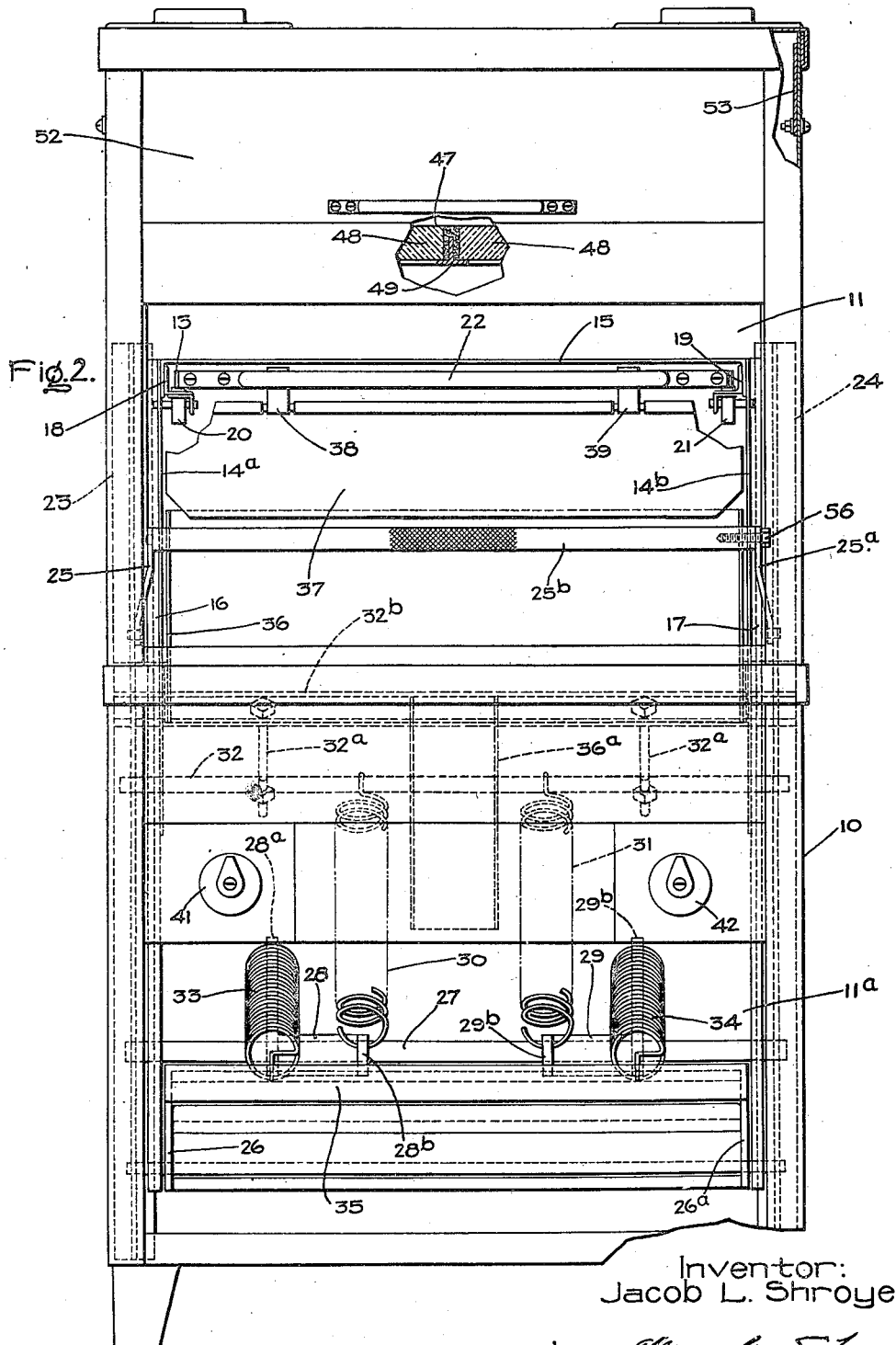

1,722,237

UNITED STATES PATENT OFFICE.

JACOB L. SHROYER, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

BROILER.

Application filed November 26, 1927. Serial No. 235,967.

My invention relates to broilers, and has for its object the provision of a simple and reliable broiler including operating means whereby the grid may be raised or lowered and maintained in any desired position.

In carrying out my invention I provide a plurality of substantialy horizontal links for connecting the grid to the supporting framework whereby the grid may be raised or lowered, together with means for counterbalancing the weight of the grid.

For a more complete understanding of my invention, reference should be had to the accompanying drawings in which Fig. 1 is a view mainly in vertical section of a broiler embodying my invention, while Fig. 2 is a front elevation view of the device shown in Fig. 1.

Referring to the drawings, I have shown my invention in one form as applied to a large broiler for heavy duty, such as would be ordinarily used in a hotel or restaurant. In the form shown, the broiler comprises a metal outer casing and supporting framework 10 of rectangular shape which forms an enclosure at the top, bottom and sides, with the exception of an upper front opening 11 and a lower front opening 11$^a$. Mounted in the upper portion of the casing on suitable brackets is a horizontally disposed heater 12, shown as an electric heater, although, obviously, any suitable source of heat may be used. Just below the heater 12 is a horizontal grid 13 on which the meat or other food to be broiled is placed. This grid is slidably mounted in a vertically adjustable framework 14 so that the grid may be pulled out for inspection of the cooking operation or removed entirely if desired.

As shown, the movable suport 14 comprises sheet metal side members 14$^a$ and 14$^b$ which are joined together at the top by one or more crossbars 15. Secured to the side plates are upright supporting bars 16 and 17 which extend downward to a point near the bottom of the casing.

As shown, the side plates 14$^a$ and 14$^b$ are cut away in front so as to provide substantially triangularly shaped front portions, the pointed ends of which project somewhat through the front opening 11 of the casing. The grid 13 is slidably supported on brackets 18 and 19 secured to the side plates, the brackets being provided with rollers 20 and 21, respectively, on which the grid rests at its sides and whereby its movement is facilitated. A handle 22 is provided on the front of the grid.

The movable support 14 for the grid is secured to the supporting framework, more specifically to angle irons 23 and 24, at each side and spaced somewhat from the back wall of the casing, and it is secured to each of these angle irons by means of a pair of parallel links. As shown, parallel links 25 and 26 are provided for connecting the upright supporting member 16 to the angle iron 23. The parts 17 and 24 are connected in a similar manner by links 25$^a$ and 26$^a$. The grid may be raised and lowered by means of a handle 25$^b$ extending across the front of the casing and secured at its ends to extensions of the links 25 and 25$^a$.

Spring mechanism is further provided for counterbalancing the weight of the grid and the support 14. As shown, a crossbar 27 is provided extending between the supports 23 and 24. On this bar are pivoted substantially bell crank shaped members 28 and 29, the member 28 being provided with arms 28$^a$ and 28$^b$ angularly disposed with respect to each other, while the member 29 is provided with similar arms 29$^a$ and 29$^b$. The lower arms 28$^b$ and 29$^b$ are resiliently connected by means of helical tension springs 30 and 31, respectively, to a cross bar 32 bearing at its ends against the rearward sides of the supports 23 and 24. This bar is adjustable vertically, and as shown, it is secured by means of a bolt 32$^a$ at each end to a cross bar 32$^b$ which is rigidly secured to the supports 23 and 24. The upper arms 28$^a$ and 29$^a$ are connected through helical tension springs 33 and 34 to a crossbar 35 which extends between the outer ends of the links 26 and 26$^a$ so as to connect them together, the springs extending at acute angles with respect to the links. The adjustment of the springs is such that the grid and operating mechanism is substantially counterbalanced in any desired vertical position in which it may be adjusted. This particular arrangement of the springs with the use of a bell crank member between the springs of each pair provides for a greater effective length of spring than could otherwise be used in the space available.

The cooperation of the bell crank and spring mechanism in counterbalancing the weight of the grid in its various positions will be understood from the following description: When the grid is being lowered from its raised position, it will be observed that the springs will be gradually elongated and, therefore, exert increasing tensions. This increase in spring tension, in so far as its effect on the vertical counterbalancing force is concerned, is offset in part by the decrease in the angles respectively between the springs 33 and 34 and the links 26 and 26$^a$, and, furthermore, by the effect of the rotation in a clockwise direction of the bell cranks 28 and 29. This rotation of the bell cranks lowers the ends of the springs 33 and 34 which are attached to the arms 28$^a$ and 29$^b$ of the bell cranks whereby the angles between the springs 33 and 34 and the arms 26 and 26$^a$ are still further decreased. At the same time it will be observed that this rotation of the bell cranks tends to shorten the springs 33 and 34 whereby their tension is decreased.

The rotation of the bell cranks is governed to a great extent by the angles between their arms, whereby the angles between the springs and the arms to which they are connected are varied. With the grid in the position shown in the drawing, the springs 30 and 31 are elongated to a greater extent than the springs 33 and 34, and, therefore, exert greater tensions than the springs 33 and 34, it being understood that the four springs are identical in length and strength. This is due to the fact that the pivot shaft 27 of the bell cranks is nearer the rod 32 to which the springs 30 and 31 are secured than it is to the crossbar 35 to which the springs 33 and 34 are secured, and by reason thereof the angles between the springs 33 and 34 and the arms 28$^a$ and 29$^a$ are greater than the angles between the springs 30 and 31 and the arms 28$^b$ and 29$^b$. The springs 33 and 34 thus have a leverage advantage and consequently the springs 30 and 31 must be elongated to a greater extent than the springs 33 and 34 in order to apply forces to the bell cranks to counterbalance the tensions of the springs 33 and 34. It will further be noted that an increase or a decrease in the angles between the arms of the bell cranks will have a very pronounced effect upon the angles between the springs 30 and 31 and the bell crank arms, whereas no appreciable change will be made in the angles between the springs 33 and 34 and the bell crank arms. Therefore, it will be seen that by changing the angles between the arms of the bell cranks, the leverage advantage of the springs 33 and 34 can be varied, whereby the rotations of the bell cranks are varied, to effect the counterbalancing force for the grid, as previously described. An increase in the angles between the arms of the bell cranks produces greater rotation of the bell cranks as the grid is lowered and thereby tends to counteract to a greater extent the increase in the counterbalancing force due to elongation of the springs, and vice versa. The angles between the arms of the bell cranks are selected with reference to the cooperating mechanism so that the grid may be substantially counterbalanced in all of its positions by suitably adjusting the vertical position of the bar 32, which adjustment is accomplished by means of bolts 32$^a$.

A drip pan 36 is provided in the casing below the grid. This pan is inclined downward from the back to the front of the casing and near the front terminates in a relatively narrow trough 36$^a$ which extends downward still further and under which a suitable receptacle may be placed by inserting it through the opening 11$^a$. A drip pan 37 is also provided directly under and secured to the grid. This pan slopes downward toward the back of the broiler and is secured at the front to a crossbar of the grid by means of hooks 38 and 39. At the back the pan 37 is supported from the grid by means of a chain 40. This pan 37 moves with the grid, and when the grid is pulled out it assures that the grease and other drippings are emptied into the pan 36.

On the front of the casing are switches 41 and 42 for controlling the heater 12, these switches being connected in the circuit of the heater through suitable electrical conductors 43 which run to the back of the casing where they are connected to suitable connectors 44. As shown, the heater 12 is provided with terminal pins 45 which are clamped in the connectors 44 by means of screws 46.

Just above the heating unit is a heat refractory heat insulating wall 47 which is made from slabs 48 of suitable material, such as soapstone, secured in a metallic framework 49. The heat insulating wall 47 acts as a partition to form an oven or warming compartment 51 between it and the top wall of the casing. The warming compartment is provided with a door 52 at the front which is ordinarily held closed by a counterweight 53. At the back end of the warming compartment is a door 54 which partitions off a compartment 55 having an opening in its bottom wall through which access may be had to the clamping screws 46. The heater 12 may be disconnected from the terminals 44, therefore, by reaching in through the doors 52 and 54 and loosening the screws 46. The heater may then be slid toward the front for a slight distance to remove the terminal pins from the connectors and then lowered and removed through the front opening 11.

In order to positively secure the grid in any adjusted position the handle 25$^b$ is secured to the ends of the links 25 and 25$^a$ in such manner that the links may be adjusted laterally so as to rub with a slight braking force against the casing. This friction furthermore counteracts any instability of the counterbalancing spring mechanism. As shown in the drawing, the handle is pivotally connected to the link 25 by means of a pin on the end of the handle which fits in an aperture in the link. The handle is connected to the link 25ª by means of a threaded bolt or screw 56 which is rigidly secured to the link, for example by screwing it into a threaded hole in the link and seating its head tightly against the link. This screw extends loosely into a tapped hole in the handle, and it will be observed that by turning the handle in the proper direction the screw will be taken up or extruded so as to give the desired spacing of the links 25 and 25ª.

While I have described my invention as embodied in concrete form and as operating in a specific manner in accordance with the provision of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:

1. A broiler comprising a supporting framework, a heater carried by said framework, a cooking grid associated with said heater, a support for said grid, a connection between said support and said framework, a pair of springs connected respectively to said support and said framework, an intermediate member mounted on said framework, and connections between said springs and said intermediate member.

2. A broiler comprising a supporting framework, a heater on said framework, a horizontally disposed grid associated with said heater, a vertically movable support for said grid, links connecting said supports to said framework, resilient means for counterbalancing the weight of said support and said grid in their adjusted vertical positions, said means comprising a member pivotally mounted on said framework and tension springs connecting said member to said grid and said framework.

3. A broiler comprising a supporting framework, a heater on said framework, a horizontally disposed grid below said heater, a vertically movable support for said grid, links connecting said support to said framework, a member pivotally mounted on said framework, a spring connecting an end of said member to said framework and a second spring connecting an end of said member to said support whereby said support and grid are counterbalanced in their adjusted vertical positions.

4. A broiler comprising a supporting framework, a horizontally disposed heater on said framework, a horizontally disposed grid associated with said heater, a vertically elongated support for said grid, parallel horizontally extending links connecting said support to said framework at the top and bottom thereof, a bell crank member pivotally mounted on said framework, a spring connecting one end of said member to said framework, and a second spring connecting the other end of said member to said support whereby said support and grid are counterbalanced in their adjusted vertical positions.

5. A broiler comprising a supporting framework, a heater on said framework, a horizontally disposed grid associated with said heater, a vertically movable support for said grid, a member pivotally mounted on said framework, a spring connecting an end of said member to a point on said framework, a second spring connecting an end of said member to a point on said support, said points being spaced unequal distances from the pivot of said member.

6. A broiler comprising a supporting framework, a heater on said framework, a grid associated with said heater, a vertically movable support for said grid, a member pivotally mounted on said framework, a spring connecting an end of said member to a point on said framework, a second spring connecting an end of said member to a point on said support, and means for varying the distance between one of said points and the pivot of said member.

7. A broiler comprising a supporting framework, a horizontally disposed heater on said framework, a horizontally disposed grid below said heater, a vertically elongated support for said grid, parallel horizontally extending links connecting said support to said framework at the top and bottom thereof, a bell crank member pivotally mounted on said framework, a spring connecting one end of said bell crank member to a predetermined point on said framework, and a second spring connecting the other end of said member to a predetermined point on said support, said points being spaced unequal distances from the pivot of said member.

8. A broiler comprising a supporting framework, a horizontally disposed heater on said framework, a horizontally disposed grid below said heater, a vertically elongated support for said grid, parallel horizontally extending links connecting said support to said framework at the top and bottom thereof, a bell crank member pivotally mounted on said framework, a spring connecting one end of said bell crank member to a predetermined point on said framework, a second spring connecting the other end of said member to a predetermined point on said support, and means for varying the distance between one of said points and the pivot of said bell crank.

9. A broiler comprising a supporting framework, a heater carried by said framework, a horizontally disposed cooking grid below said heater, horizontally extending substantially parallel links connecting said grid to said framework, and a resilient member connected to one of said links so as to exert a force thereon tending to counterbalance the weight of said grid.

10. A broiler comprising a supporting framework, a heater carried by said framework, a horizontally disposed cooking grid below said heater, horizontally extending, substantially parallel links connecting said grid to said framework, and a helical spring connected to one of said links so as to extend at an acute angle with respect thereto whereby a force is exerted on said link so as to counterbalance the weight of the grid.

11. A broiler comprising a supporting framework, a heater carried by said framework, a horizontally disposed cooking grid below said heater, horizontally extending links connecting said grid to said framework including a pair of links provided with extensions arranged to bear on said framework to produce a braking force, a crossbar forming a handle connected to said extensions, and means associated with said handle for controlling said braking force.

12. A broiler comprising a supporting framework provided with a front opening, a heater in said framework, a horizontally disposed grid below said heater, a vertically movable support for said grid, horizontally extending links connecting said support to said framework including an upper pair of links provided with extensions projecting from said opening, a crossbar forming a handle connected to said extensions, the connection between said handle and said extensions being arranged so that rotation of said handle varies the spacing of said extensions whereby said extensions are caused to rub on said framework to produce a braking force.

13. A broiler comprising a supporting casing, a heater in said casing, terminal connections for said heater at the rear of said casing, a partition in said casing forming an oven compartment above said heater, and a door at the rear of said compartment through which access is had to said terminal connections.

In witness whereof, I have hereunto set my hand this 23rd day of November, 1927.

JACOB L. SHROYER.